US011398074B1

(12) United States Patent
Liu et al.

(10) Patent No.: US 11,398,074 B1
(45) Date of Patent: Jul. 26, 2022

(54) METHOD AND APPARATUS FOR IDENTIFYING PLANES OF OBJECTS IN 3D SCENES

(71) Applicant: Hong Kong Applied Science and Technology Research Institute Company Limited, Hong Kong (CN)

(72) Inventors: Chongshan Liu, Hong Kong (CN); Xueyan Tang, Hong Kong (CN); Chun Li, Hong Kong (CN); Suk Ling Li, Hong Kong (CN)

(73) Assignee: HONG KONG APPLIED SCIENCE AND TECHNOLOGY RESEARCH INSTITUTE COMPANY LIMITED, Hong Kong (CN)

( * ) Notice: Subject to any disclaimer, the term of this patent is extended or adjusted under 35 U.S.C. 154(b) by 0 days.

(21) Appl. No.: 17/301,986

(22) Filed: Apr. 21, 2021

(51) Int. Cl.
*G06T 17/10* (2006.01)
*G06T 17/20* (2006.01)
*G06K 9/62* (2022.01)

(52) U.S. Cl.
CPC .............. *G06T 17/10* (2013.01); *G06K 9/628* (2013.01); *G06K 9/6276* (2013.01); *G06T 17/20* (2013.01); *G06T 2207/10028* (2013.01)

(58) Field of Classification Search
CPC ................. G06T 17/10; G06T 17/20; G06T 2207/10028; G06K 9/6276; G06K 9/628
See application file for complete search history.

(56) References Cited

U.S. PATENT DOCUMENTS

| 7,990,379 B2 | 8/2011 | Aharon et al. |
| 2014/0306955 A1 | 10/2014 | Dionne et al. |

(Continued)

FOREIGN PATENT DOCUMENTS

| CN | 110222642 A | 9/2019 |
| CN | 110443810 A | 11/2019 |

OTHER PUBLICATIONS

Saglam, Ali, et al. "Boundary constrained voxel segmentation for 3D point clouds using local geometric differences." Expert Systems with Applications 157 (2020): 113439. (Year: 2020).*

(Continued)

*Primary Examiner* — Daniel F Hajnik
(74) *Attorney, Agent, or Firm* — Eagle IP Limited; Jacqueline C. Lui

(57) ABSTRACT

Computer implemented methods and computerized apparatus for identifying planes of a 3D object in a 3D scene are provided. The method comprises receiving a point cloud and performs plane segmentation. In one embodiment, the point cloud is voxelized into a plurality of voxels of equal dimensions and the plurality of voxels are classified into three categories, wherein each first category voxel satisfies a planar requirement and a first neighborhood constraint, each second category voxel satisfies the planar requirement and a second neighborhood constraint, and each third category voxel does not satisfy the planar requirement. The method further comprises generating at least one reference plane from the first category voxels by first identifying a first category anchor voxel and recruiting its neighboring first category voxels to this at least one reference plane; and growing the at least one reference plane by absorbing second category voxels connecting to the at least one reference plane if they satisfy a voxel merging requirement and absorbing points in the third category voxels connecting to the at least one reference plane if they satisfy a point merging requirement. Then the set of at least one reference plane is used to represent the 3D object for further applications.

17 Claims, 15 Drawing Sheets

(56) References Cited

U.S. PATENT DOCUMENTS

| | | |
|---|---|---|
| 2016/0154999 A1 | 6/2016 | Fan et al. |
| 2017/0372513 A1 | 12/2017 | Zeng et al. |
| 2020/0221134 A1 | 7/2020 | Faramarzi et al. |
| 2020/0250829 A1 | 8/2020 | Gleich et al. |
| 2021/0012555 A1 | 1/2021 | Zhou et al. |

OTHER PUBLICATIONS

Dong, Zhen, et al. "An efficient global energy optimization approach for robust 3D plane segmentation of point clouds." ISPRS Journal of Photogrammetry and Remote Sensing 137 (2018): 112-133. (Year: 2018).*

Aijazi, A.K et al. (2013) Segmentation Based Classification of 3D Urban Point Clouds: A Super-Voxel Based Approach with Evaluation. Remote Sens. (5) 1624-1650.

Poux, F., & Billen, R. (2019). Voxel-based 3D Point Cloud Semantic Segmentation: Unsupervised geometric and relationship featuring vs deep learning methods. ISPRS International Journal of Geo-Information, 8(5).

\* cited by examiner

1400

| 997K points | | |
|---|---|---|
| PCL | Open3D | The present invention |
| 1.3422 s | 0.6402 s | 0.1936 s |

| 1550k points | | |
|---|---|---|
| PCL | Open3D | The present invention |
| 310.695 s | 19.062 s | 1.876 s |

| 241K points | | |
|---|---|---|
| PCL | Open3D | The present invention |
| 1.3042 s | 0.1982 s | 0.1028 s |

FIG. 14

METHOD AND APPARATUS FOR IDENTIFYING PLANES OF OBJECTS IN 3D SCENES

FIELD OF INVENTION

This invention relates generally to three-dimensional (3D) object measurement and recognition, and in particular, to methods and apparatus for identifying planes of a 3D object in a 3D scene.

BACKGROUND OF INVENTION

Image segmentation is one type of image analysis that is often used for partitioning an image into different regions to provide a more meaningful representation of the image. An image may be segmented for uniquely identifying objects within images. Nowadays, 3D vision is becoming one of the top emerging markets that attracts a lot of attention in recent years. This technology has overwhelming advantages of providing complete information on a 3D physical space, giving rise to 3D metrology applications such as factory line automation, building construction, automotive enhancement, etc.

However, existing approaches in segmentation of three-dimensional data to identify planes of 3D objects are both computationally expensive and inaccurate. It is therefore desirable to provide a system, which can provide a high accuracy plane segmentation in a short processing time.

SUMMARY OF INVENTION

In the light of the foregoing background, alternate computer implemented methods and apparatus are provided for identifying planes of a 3D object in a 3D scene.

According to an embodiment of the present invention, a computer implemented method for identifying planes of objects in 3D scenes is provided. The method comprises receiving a point cloud of a 3D scene, wherein the 3D scene comprises at least one 3D object represented by a plurality of points in the point cloud. The method further comprises voxelizing the point cloud into a plurality of voxels of equal dimensions and classifying the plurality of voxels into three categories, wherein each first category voxel satisfies a planar requirement and a first neighborhood constraint, and each second category voxel satisfies the planar requirement and a second neighborhood constraint, and each third category voxel does not satisfy the planar requirement. The method further comprises generating at least one reference plane from the first category voxels by first identifying a first category anchor voxel and recruiting its neighboring first category voxels to this at least one reference plane; growing the at least one reference plane by absorbing second category voxels connecting to the at least one reference plane if they satisfy a voxel merging requirement; and absorbing points in the third category voxels connecting to the at least one reference plane if they satisfy a point merging requirement; and using the set of at least one reference plane to represent the 3D object.

Accordingly, an example embodiment of the present invention relates to a computerized system comprising a processor and a memory coupled to the processor. The memory and the processor together are configured to cause the computerized system to perform actions according to the above embodiments.

The above example embodiments have benefits and advantages over conventional approaches. For example, the current method is able to segment planes in a 3D scene much faster and much more accurate by using the algorithm described herein. Therefore, it fulfills real-time 3D metrology requirements and is applicable for various verticals.

Moreover, the computer implemented methods are compatible with different 3D sensors and can be applied in various applications for different industries such as in building construction or for high-precision microscopes.

BRIEF DESCRIPTION OF FIGURES

Through the following detailed description with reference to the accompanying drawings, the above and other features, advantages and aspects of embodiments of the present invention will become more apparent. In the drawings, identical or similar reference signs represent identical or similar elements, wherein:

FIG. 14 shows a performance comparison between the present invention and other conventional approaches;

DETAILED DESCRIPTION OF THE PREFERRED EMBODIMENTS

As used herein and in the claims, the term "comprising" means including the following elements but not excluding others. The term "based on" is to be read as "based at least in part on." The term "one example embodiment" and "an example embodiment" are to be read as "at least one example embodiment." The term "another embodiment" is to be read as "at least one other embodiment."

As used herein and in the claims, "a 3D object" refers to any actual object or any 3D model generated by CAD (Computer Aided Design) or CAE (Computer Aided Engineering) with 3D planes in a 3D space, which can be represented by a plurality of points in a point cloud of a 3D scene. Similarly, 2D refers to two dimension and 1D refers to one dimension.

As used herein and in the claims, "connecting" refers to a relation of neighboring. Two voxels are connected with each other if they share a common boundary. They are also referred as neighboring voxels.

As used herein and in the claims, sequenced thresholds are predefined and used to differentiate each other. They are individually independent and therefore the value of each may be the same or different. Moreover, "pre-determined" or "pre-specified" can be used interchangeably with "pre-defined".

The following example embodiments alone or in combination may be practiced to provide methods and systems for plane-related measurements and object recognition of 3D objects in various applications for different industries such as in automation, building construction or for high-precision microscopes. Examples of the plane-related measurements may comprise building construction measuring, planar shape measuring for industry parts, dimension measuring for industry parts, etc.

Figure 1:
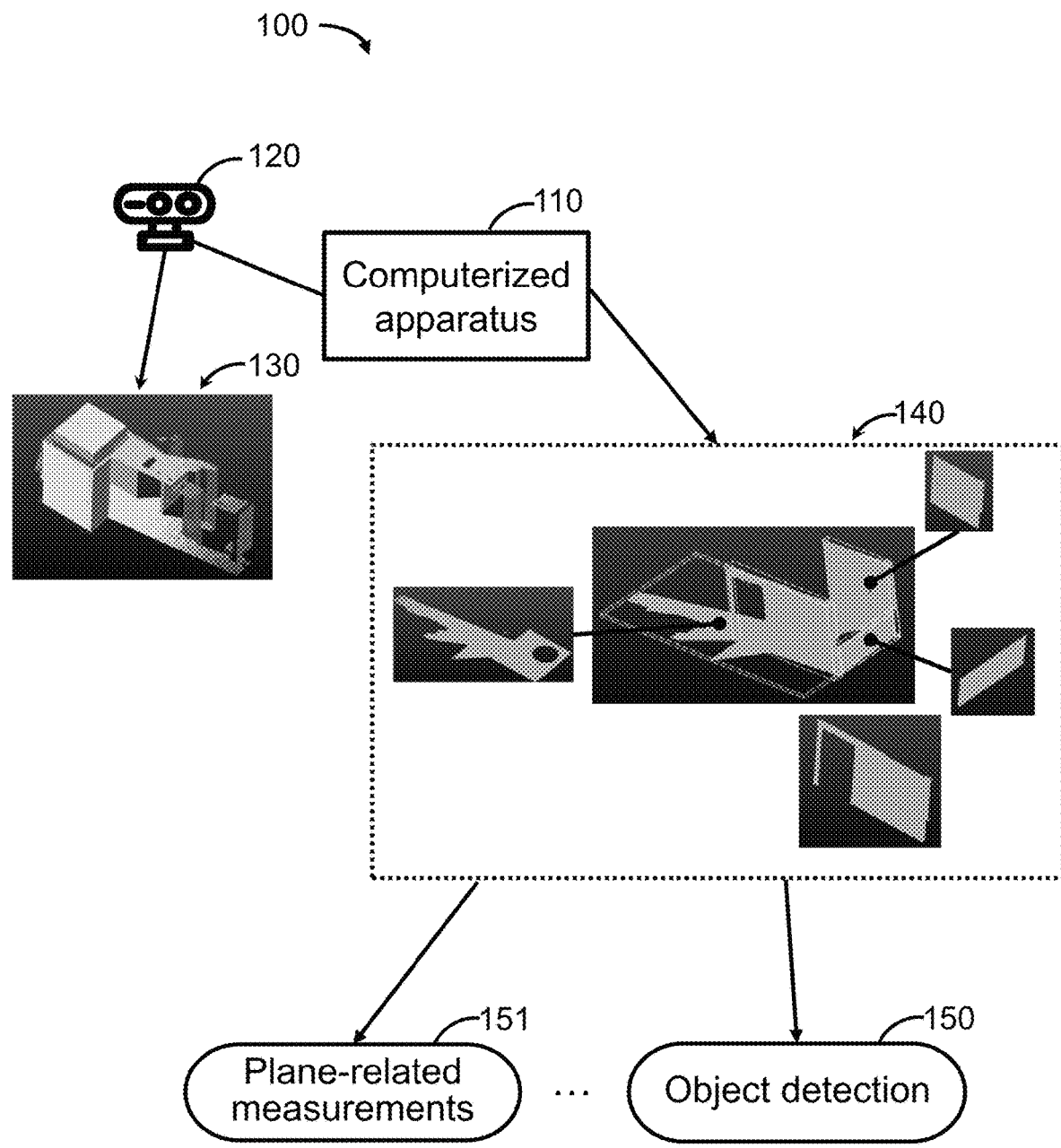
FIG. 1 illustrates an exemplary scenario where embodiments of the present invention can be applied.

FIG. 1 show a diagram 100 illustrating one exemplary scenario where embodiments of the present invention can be applied. In this scenario of a building construction, a computerized apparatus 110 is provided for plane-related measurements and object recognition of 3D objects in a 3D scene 130 of a building construction. This 3D scene 130 can be a scanned 3D scene or a 3D model generated by CAD/CAE. In other embodiments, the 3D scene 130 may be any scene in a physical environment, which includes one or more physical objects with dimensions and shapes, such as a 3D scene of the mobile phone tablet, a 3D scene of a part tray containing a plurality of parts, etc.

One or more 3D sensors 120 are positioned to capture the 3D vision of the 3D scene 130 and coupled with the computerized apparatus 110 to provide 3D data of the 3D scene 130 to the computerized apparatus 110. The computerized apparatus 110 processes the 3D data for different applications (e.g., applications 150-151), as will be described below in detail.

Exemplary 3D sensors that can be used herein include, but are not limited to, 3D scanners, digital cameras, and other types of devices that are capable of capturing images of a real-world object and/or scene to collect data on its position, location, and appearance. Depending on the applications, the computerized apparatus 110 may be standalone computer(s) or embedded system(s), including, but not limited to, a laptop computer, a desktop computer, a tablet computer, a smart phone, an internet appliance, an embedded device, or the like. The 3D sensor 120 may be physically separate with the computerized apparatus 110, or collocated with or embedded into the computerized apparatus 110.

The computerized apparatus 110 processes the 3D data of the 3D scene 130 and segments planes in the 3D scene 130. As illustrated in 140, planes in the 3D scene have been identified. These segmented planes can then be used for various applications.

As a result of the process of plane segmentation, at block 150, an object detection is performed to recognize objects. Alternative, at block 151, plane-related measurements are further applied on the identified planes for other building construction purposes.

Figure 2:
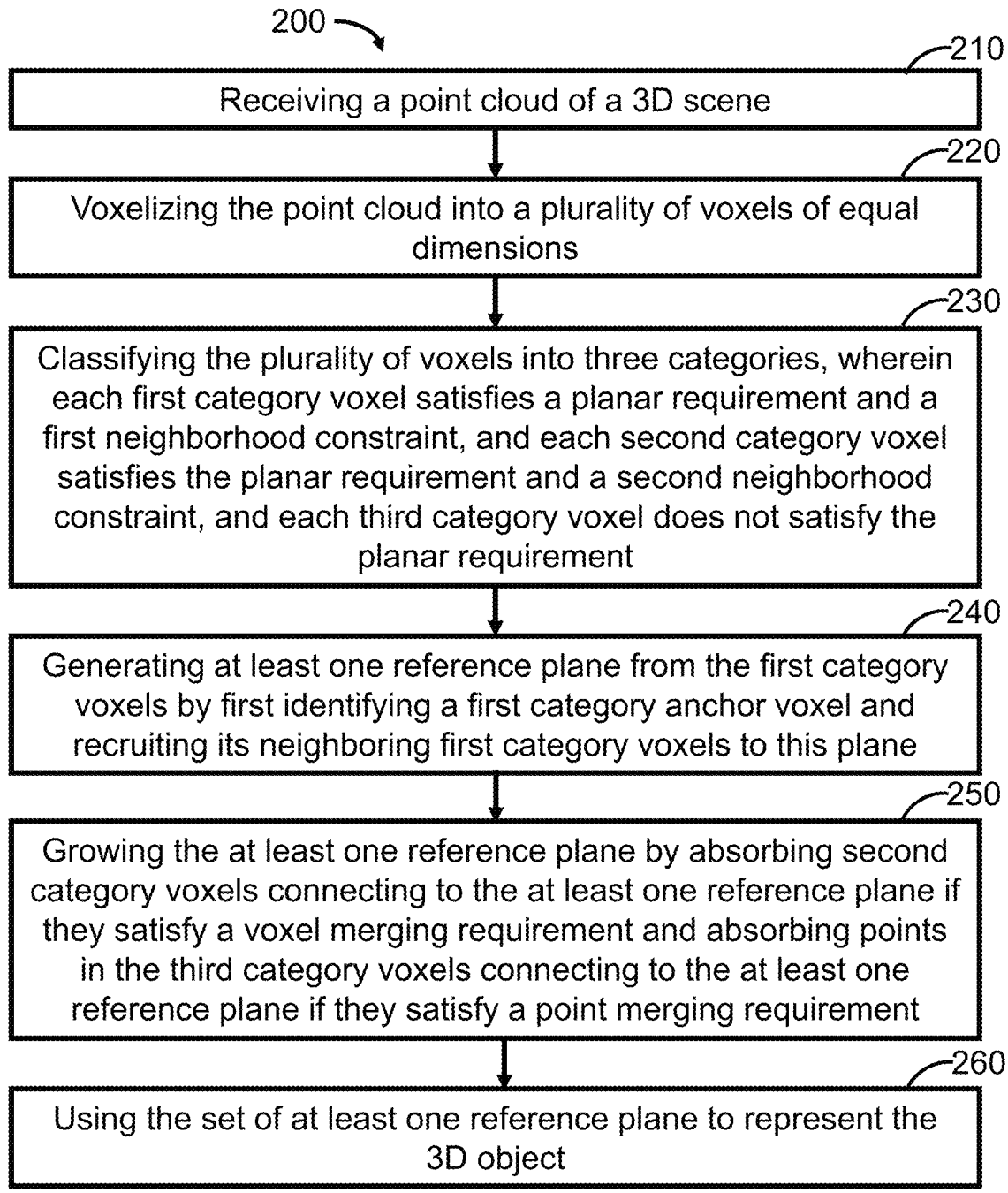
FIG. 2 is a flowchart of a method for identifying planes of a 3D object in a 3D scene according to an embodiment of the present invention.

FIG. 2 is a flowchart of a method 200 for identifying planes of a 3D object in a 3D scene according to an embodiment of the present invention. The method 200 may be implemented by for example the computerized apparatus 110 as shown in FIG. 1.

At 210, the computerized apparatus receives or obtains a point cloud of a 3D scene. The 3D scene comprises at least one 3D object represented by a plurality of 3D points in the point cloud. The point cloud may be produced by a 3D sensor and transferred to the computerized apparatus by various ways, either wirelessly, or by wire externally or internally.

It is worthy to note that the point cloud may be formed in a certain data format and structure to facilitate computerized proceedings. The present invention does not put any limitation in this regard.

At 220, the computerized apparatus voxelizes the point cloud into a plurality of voxels of equal dimensions. In the course of this voxelization, a voxel size is calculated, then the point cloud is partitioned in a 3D space into voxels with the same voxel size (i.e. with equal dimension). In an embodiment, a voxel size is determined based on the setting(s) of the 3D sensor. In another embodiment, depending at least on the point distribution within the point cloud and the granularity or precision that a measurement application requires, a voxel size is determined by a human operator to ensure that there are enough points in voxels for the 3D object measurements.

At 230, the plurality of voxels are classified into three categories. To improve the accuracy as well as the speed of plane segmentation and identification, each voxel is labelled as one of three different categories according to whether the points inside this voxel demonstrate a planar distribution in addition to the structure relation between this voxel and its neighboring voxels. In other words, each first category voxel satisfies a planar requirement and a first neighborhood constraint, each second category voxel satisfies the planar requirement and a second neighborhood constraint, and each third category voxel does not satisfy the planar requirement.

Ideally, the first category voxels represent central region of a plane, the third category voxels represent boundary region of the plane, and the second category voxels represent a transition region from the central region to the boundary region of the plane. In this way, voxel labelling facilitates the generation of reliable reference planes in a fast voxel-by-voxel manner, which in turn improves the accuracy and speed of plane identification. The details about the voxel labelling or classification will be discussed below.

At 240, at least one reference plane is generated from the first category voxels by first identifying a first category anchor voxel and recruiting its neighboring first category voxels to this at least one reference plane. Then at 250, the at least one reference plane is grown by absorbing second category voxels connecting to the at least one reference plane if they satisfy a voxel merging requirement and absorbing points in the third category voxels connecting to the at least one reference plane if they satisfy a point merging requirement.

It is worthy to note that the voxel by voxel merging and point by point merging in the course of generation of reference planes can be processed in parallel by the computerized apparatus 110. Therefore, the accuracy and speed of plane identification can be significantly improved comparing to conventional processes.

At 260, the set of at least one reference plane is used to represent the 3D object. Then these planes in the 3D scene may be used for different applications, such as plane-related measurements etc.

It will be noted that, though the operations are described above in a specific order, the operations are not necessarily performed following the above particular order. For example, some operations may be performed in a multi-task manner or in parallel.

Figure 3:
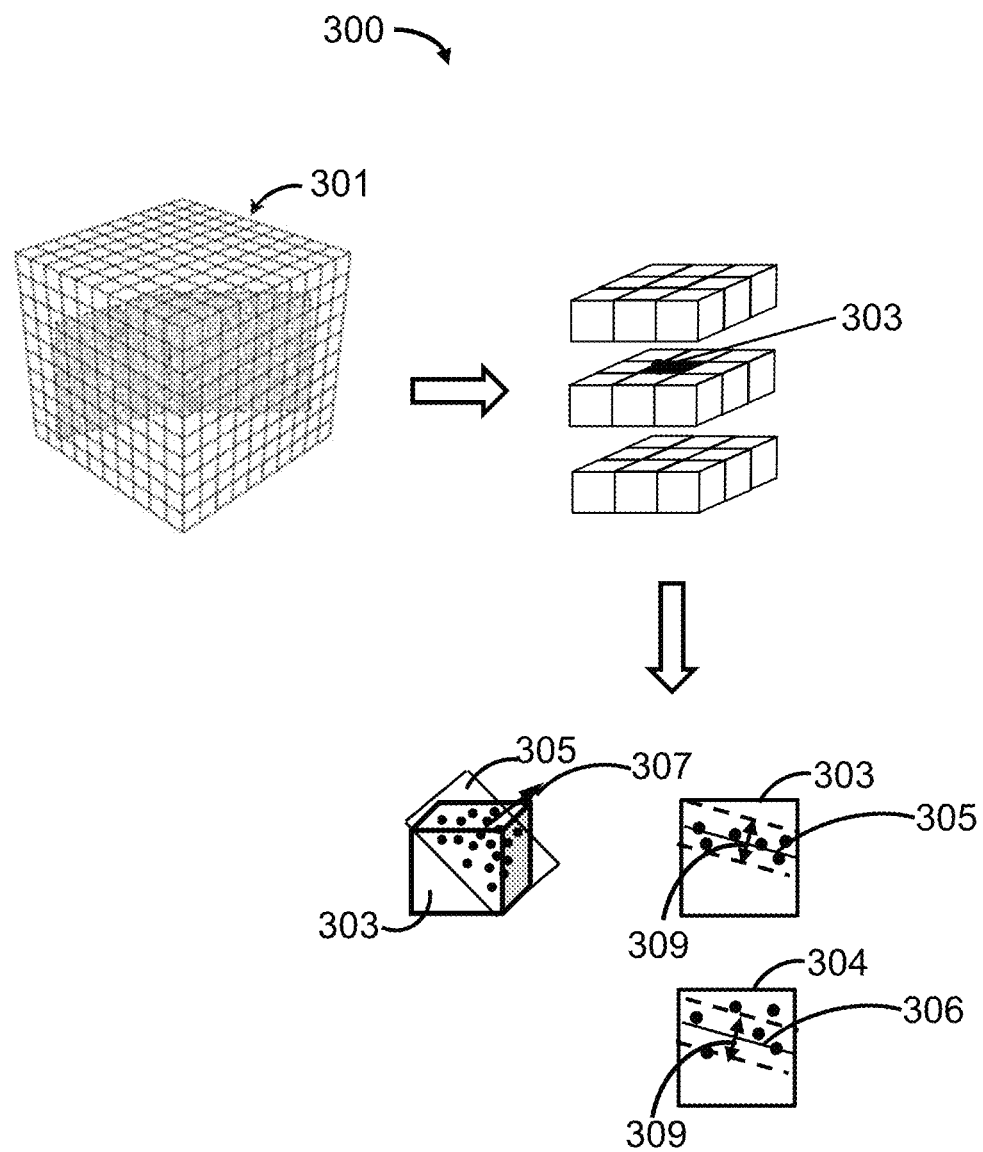
FIG. 3 illustrates a process for voxel labeling according to an embodiment of the present invention.

Further to the step of 230, FIG. 3 illustrates a process 300 for voxel labeling according to an embodiment of the present invention. In this embodiment, voxels are classified into three categories, comprising first category namely good voxels, second category namely pseudo bad (PB) voxels and third category namely bad voxels.

From a visual perspective, as shown in FIG. 3, a point cloud or a part of a point cloud where a 3D scene including 3D object(s) in a 3D space 301 is voxelized into a number of voxels with equal dimension, such as voxel 303. To simplify the illustration, two planes are presented in the 3D space.

Each voxel may contain a number of points. Based on these points inside, it can be determined whether this voxel satisfies a planar requirement. According to embodiments of the present invention, the planar requirement defines conditions whether the points within the voxel demonstrate a planar distribution in a 2D planar structure within the 3D space. This planar structure is represented by at least one planar parameter which may consist of a normal vector that describes the orientation of this 2D plane in the 3D space and additionally an offset. In one embodiment, the offset is obtained from the mean value of all the points within this voxel.

According to one embodiment, to classify voxels, the first step is to check whether a plane fits the points inside a voxel well. In one embodiment, fitting a plane against a set of points means whether it is possible to find a 2D planar structure that can represent the points such that the cumulative distance between the points and the plane is within a certain bound. If the plane can be found, whether the points within the voxel demonstrate a planar distribution is then determined. The classification process may follow as below.

If points inside a voxel cannot be well fit into a plane, this voxel is classified as a third category voxel, i.e., a bad voxel.

If a plane that fits the points inside a voxel can be found, and the points inside this voxel are distributed within the boundary of the plane, this voxel meets the planar requirement and is classified as a first category voxel (i.e., a good voxel) or a second category voxel (i.e., a pseudo bad voxel), depending on a neighborhood constraint.

The neighborhood constraint represents a likelihood of neighbor voxels being coplanar with the central voxel. It can be indicated by the number of good neighbors and bad neighbors as explained further below.

As an example, a voxel 303 in the 3D space 301 as a central voxel has 26 neighbor voxels. It contains a number of points and a plane 305 that fits the points inside the voxel 303 is found. Accordingly, the planar parameters of the voxel 303 are computed. The planar parameters comprise a normal vector 307 of the plane 305 and an offset (not shown) of the plane 305. Label 309 represents a tolerance boundary. If most of the points are within this boundary, then the plane fits the points inside the voxel well. Otherwise, if many points are outside this boundary such that the cumulative distance between these points and the plane exceeds a pre-specified bound, this voxel is classified as a bad voxel.

As shown in FIG. 3, most points in the voxel 303 are within the boundary 309, so the plane 305 fits the points inside the voxel 303 well and the voxel 303 meets the planar requirement. While most points in the voxel 304 are outside the boundary 309 and the plane 306 does not fit the points inside the voxel 304 well, so the voxel 304 fails in meeting the planar requirement and is classified as a bad voxel.

The boundary 309 is a threshold parameter that is related to the application scenarios. For example, in building construction the voxel size may be 50-80 mm and in microscope or electronics measurements it may be around 5 mm. In an embodiment, the threshold is set to be (k*voxel_size) where k is between 0.1-0.2.

The plane 305 extends across the 26 neighbor voxels and covers a plurality of these neighbor voxels, namely planar neighbor voxels. In an embodiment, a good neighbor is a neighboring voxel that satisfies a planar alignment requirement and a bad neighbor is a neighboring voxel that does not satisfy the planar alignment requirement. The planar alignment requirement comprises that the angular alignment of normal vector of the neighboring voxel against the normal vector of the given voxel is less than a pre-specified value.

In other words, a good neighbor is a neighboring voxel that satisfies the above mentioned planar requirement and aligns with this voxel to be classified, and a bad neighbor is a neighboring voxel that does not satisfy the planar requirement or does not align with this voxel to be classified. Here, aligning with the voxel can be determined by comparing the normal vectors of the planes of the voxel and its neighboring voxel. If the angle between the two normal vectors is less than a threshold, they are aligned.

In the conditions that the number of good neighbors is no less than a first predefined threshold (e.g., 5) and the number of bad neighbors is less than a second predefined threshold (e.g., 3), the voxel 303 is classified as a first category voxel, i.e., a good voxel. In the condition that the number of good neighbors is no less than a third predefined threshold (e.g., 3) and the number of bad neighbors is no less than the second predefined threshold, the voxel 303 is classified as a second category voxel, i.e., a pseudo bad voxel.

Through the voxel classification, it allows a faster voxel-by-voxel way to generate reference planes and also improves the reliability of segmenting planes in 3D scenes.

Figure 4:
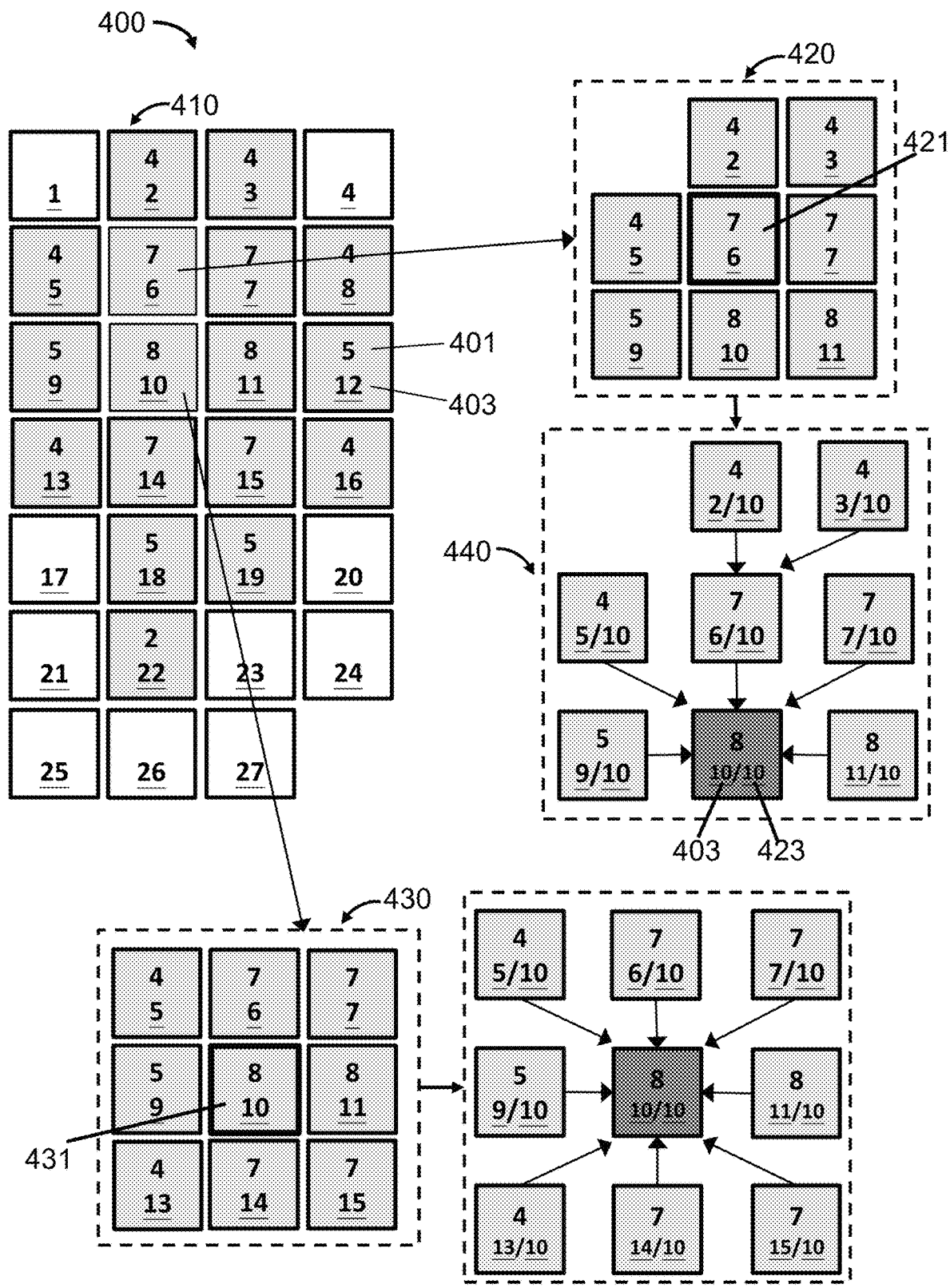
FIG. 4 and FIG. 5 illustrate a process with a portion of voxels forming a reference plane from good voxels according to an embodiment of the present invention.
Figure 5:
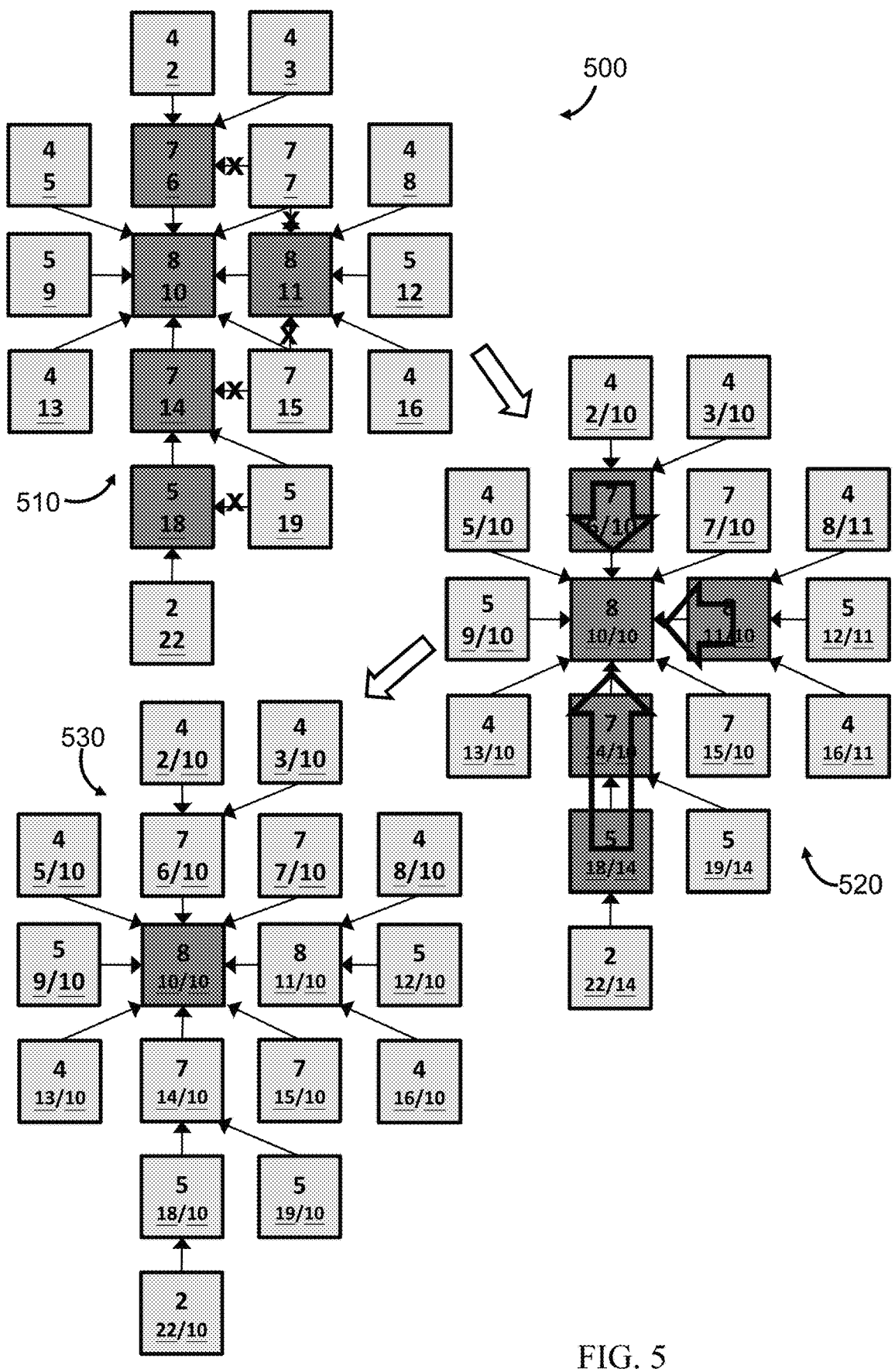

Based on the classified voxels, the computerized apparatus can start segmenting reliable reference planes from good voxels and pseudo bad voxels. First, as stated in the step of 240, reference planes are generated from good voxels. FIG. 4 to FIG. 5 illustrate this process with a portion of voxels forming one reference plane as an example.

As shown in FIG. 4, a portion of voxels (27 voxels as shown) are discussed in the process 400, where good voxels are indicated with gray background while bad voxels and pseudo bad voxels with no background. Each voxel is indexed with a unique initial voxel index, indicated as 403.

For each good voxel, a voxel neighbor group is formed with itself as center and voxels adjacent to the center. Then a good neighbor count (indicated as 401) is computed and assigned to this voxel, where the good neighbor count is the number of good voxels in this voxel neighbor group. For example, voxel neighbor groups 420 and 430 are formed for good voxels 421 and 431. Good voxel 421 has an initial voxel index 6 and a good neighbor count 7 which is the total number of good voxels surrounding it, and good voxel 431 has an initial voxel index 10 and a good neighbor count 8. Such indexing applies to all the good voxels.

To generate a reference plane from these good voxels, a parent voxel or an anchor voxel is identified and then its neighboring good voxels are recruited to the reference plane. Identifying a parent voxel is an iterative process on the basis of the voxel neighbor groups.

According to one embodiment, for each voxel neighbor group, a parent voxel index is first assigned to all members of this voxel neighbor group. The parent voxel index is the initial voxel index having the highest good neighbor score within this voxel neighbor group. The good neighbor score may be relevant to the following factors: (1) having most good neighbor voxels; (2) having fewest bad neighbor; (3) being flattest voxel in the voxel neighbor group; or any combination of the above.

Using the voxel neighbor group 420 as an example, the voxel with the highest good neighbor count in the group 420, i.e., the voxel with initial voxel index 10, is identified as a parent voxel, and all member voxels in this group are assigned the same parent voxel index 10, as indicated by 423. Here in this voxel, label 403 represents the initial voxel index and label 423 represents the parent voxel index. As mentioned earlier, all voxels within this voxel group 440 are assigned the same parent voxel index. In this example, there are two voxels having the same highest good neighbor counts. Other factors of the good neighbor score may be further applied to identify a parent voxel. In one embodiment, if there are more than one voxel within this voxel neighbor group having the same highest good neighbor score, the voxel that has the lowest initial index is chosen as the parent voxel.

The same applies to each voxel neighbor group. As a result, for the voxel neighbor group 430, the voxel with initial voxel index 10 is identified as a parent voxel, and all member voxels in this group are assigned a parent voxel index 10. Additionally, within each group, pointers are used to indicate the relation between individual voxel and its parent voxel.

FIG. 5 further illustrates a process 500 of how the parent voxel is updated or propagated in the portion of voxels. An initial relationships among these good voxels after each voxel neighbor group has been assigned a parent voxel are indicated by diagram 510, where redundant relations exist due to overlapped voxel neighbor groups and these redundancy should be eliminated by updating parent voxels.

Arrows in diagram 520 show in this scenario how to update the parent voxels. For voxel neighbor groups that overlap with each other by at least one voxel, a process of designating parent voxel is proceeded iteratively.

If the parent voxel indices among these voxel neighbor groups are different, a parent voxel index that has the highest good neighbor score among them is identified as designated parent voxel index. For the voxel neighbor groups which do not have the highest good neighbor score, the parent voxel index of all voxels in these groups is re-assigned to the designated parent voxel index. Then the designation step is repeated until no further re-assignment occurs. In case that there are more than one voxel neighbor groups having the same highest good neighbor score, the lowest parent voxel index may be selected as the designated parent voxel index.

After parent voxels are updated in these overlapped voxel neighbor groups, a single parent voxel is identified for these good voxels, as shown in diagram 530. Within this portion of voxels, the parent voxel is found as the voxel with initial voxel index 10, and all the good voxels share the same parent voxel. A reference plane, which is represented by a normal vector and an offset in 3D space, is generated from these good voxels that have the same parent voxel index.

In one embodiment, the reference plane is constructed based on all the points within these good voxels that have the same parent voxel index. The mean value of these points, as well as the corresponding eigenvalues and eigenvectors are computed. Based on these computed results, a reference plane that best fits these data points is obtained. With the process of 400 and 500, a plurality of reference planes can be generated for a 3D scene.

Next, each reference plane is grown by using some of second category voxels and some points inside third category voxels, as stated in the step of 250. FIG. 6 to FIG. 9 illustrate this process with the same portion of voxels as in FIG. 4.

Figure 6:
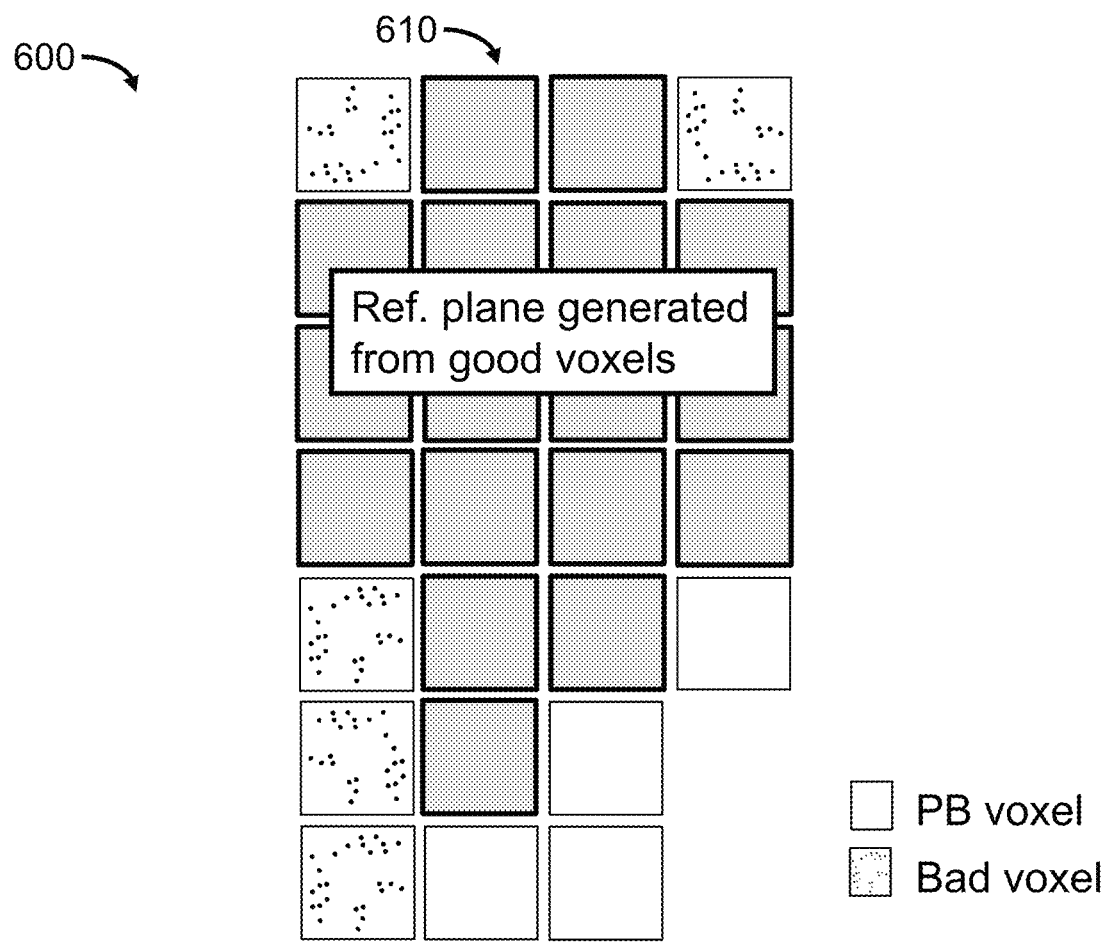
FIG. 6 to FIG. 9 illustrate a process using the same portion of voxels as in FIG. 4 forming a reference plane from good voxels and PB voxels according to an embodiment of the present invention.
Figure 6:
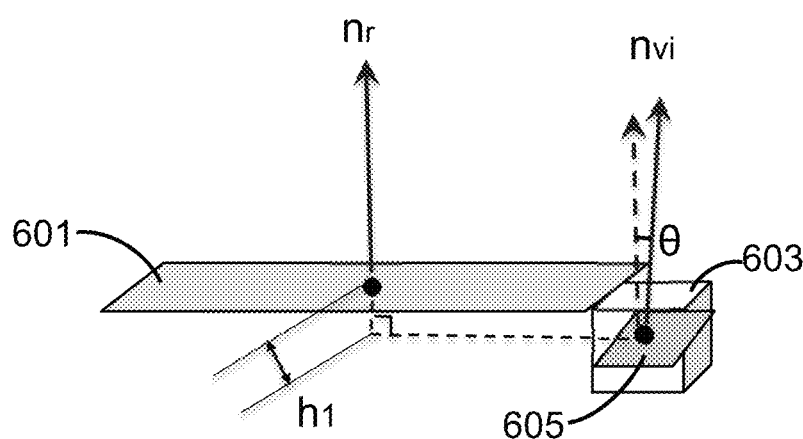

As shown in FIG. 6, a reference plane 601 has been generated from good voxels, and the bad voxels and pseudo bad (PB) voxels are indicated with different backgrounds, as indicated in the diagram 610. For each PB voxel such as voxel 603, the points inside are well fitted to a plane 605 represented by its normal vector $n_{vi}$. In the event that the PB voxel 603 meets a voxel merging requirement, it is merged to the reference plane 601. Otherwise it is labelled as a bad voxel.

The voxel merging requirement indicates whether a plane of a PB voxel is aligned and close enough with the reference plane. According to an embodiment, the voxel merging requirement comprises the following conditions: the normal vector of the reference plane and the normal vector of the plane of the PB voxel are proximately equal; and the offset distance between the reference plane and the plane of the PB voxel is less than a fourth predefined threshold.

As an example, if the angle θ between the normal vector $n_r$ of the reference plane 601 and the normal vector $n_{vi}$ of the plane 605 is less than a threshold, and additionally the distance $h_1$ is also within a limit, the PB voxel 603 satisfies the voxel merging requirement and it is merged into the reference plane. The distance $h_1$ can be the offset distance between two planes 601 and 605, or it can be a distance from the central point of the plane 605 to the central point of the reference plane 601 along the normal vector $n_r$. In a further embodiment, merging a voxel to a reference plane involves incorporating the points in the PB voxel to re-compute the normal vector and the offset of the reference plane.

Figure 7:
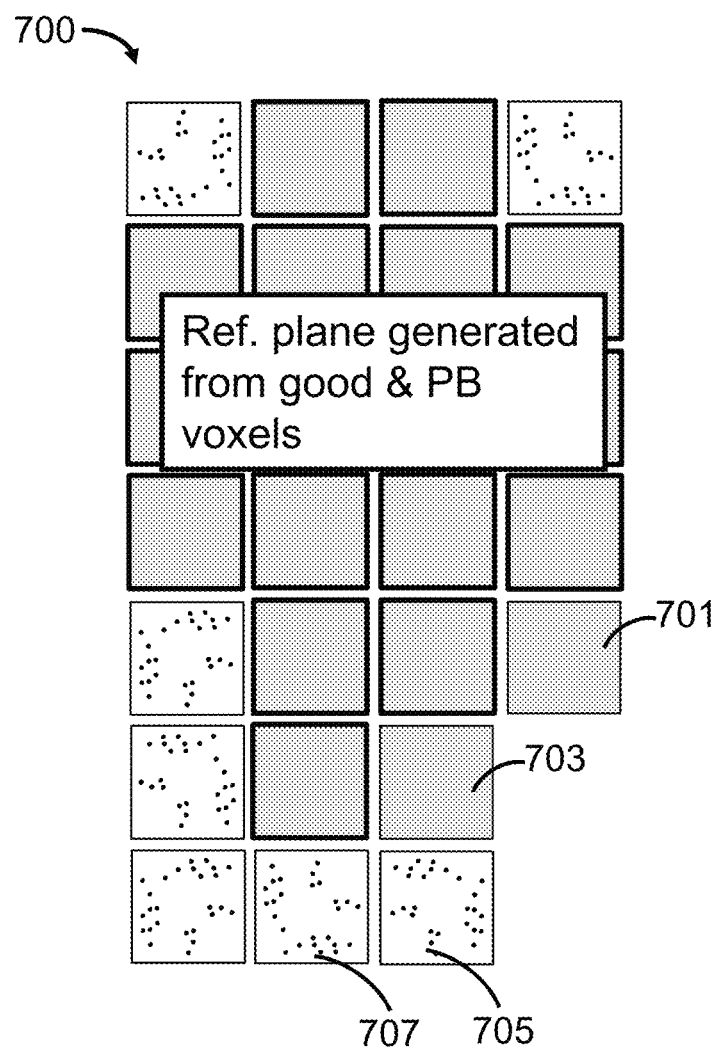

As a result of the process 600, some PB voxels are merged to reference planes and some PB voxels are labelled as bad voxels, as shown by the diagram 700 in FIG. 7. It is seen that PB voxels 701 and 703 are merged to the reference plane while PB voxels 705 and 707 are labelled as bad voxels.

In the way of absorbing those PB voxels that satisfy the voxel merging requirement to respective reference planes, planes in a 3D scene are segmented with finer accuracy. Further, these planes (i.e., updated reference planes) can be further grown so as to be more reliable by absorbing some points in the bad voxels connecting to the reference planes.

Figure 8:
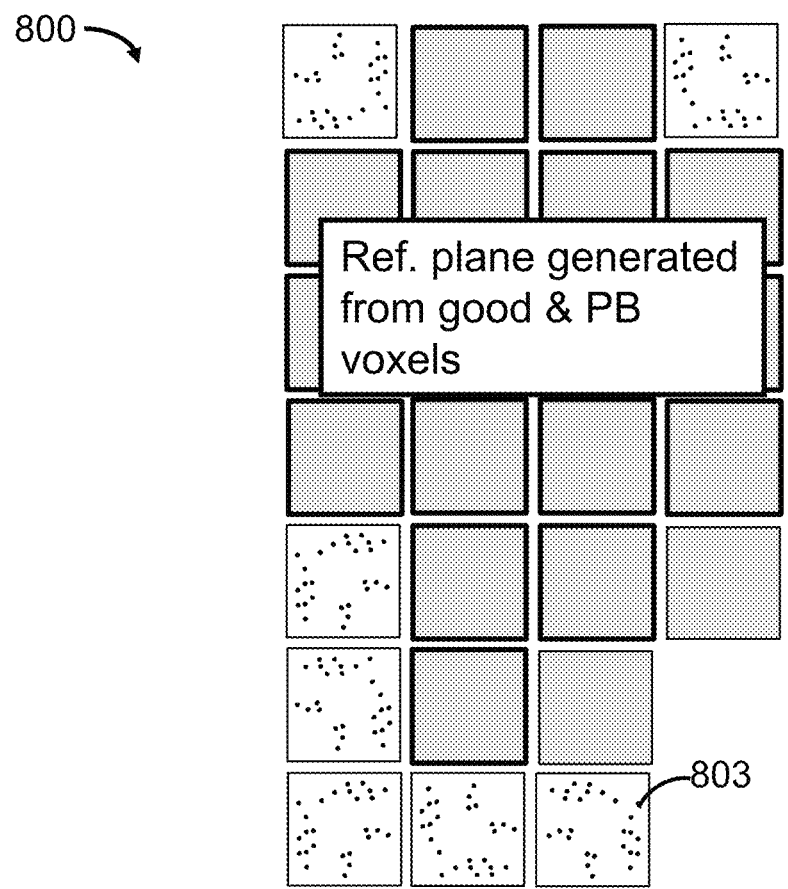
Figure 8:
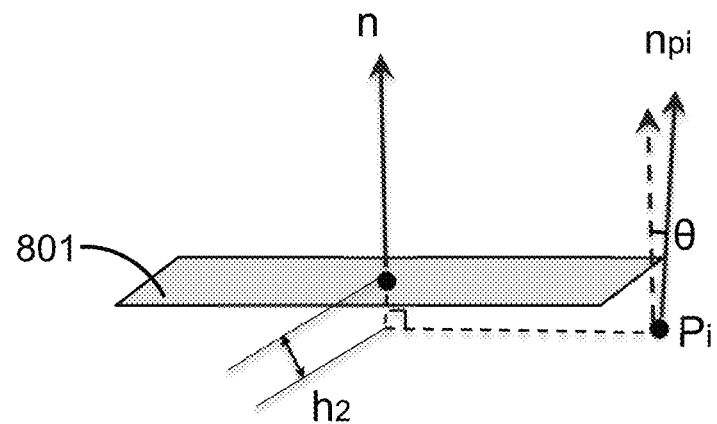

FIG. 8 illustrates a process 800 of merging points in neighboring bad voxels to reference planes based on voxel topology. As shown in FIG. 8, a reference plane 801 has been generated from good voxels and some PB voxels, and the bad voxels including those labelled from some PB voxels are indicated with points in background. For each point Pi such as point 803 in a bad voxel, its normal vector $n_{pi}$ is computed. To estimate its normal vector $n_{pi}$, the neighboring points within a pre-specified radius are searched, and its normal vector $n_{pi}$ is computed based on the points within the radius. In the event that the point 803 meets a point merging requirement, it is merged in the reference plane 801. Otherwise it stays as remaining points to be further processed.

The point merging requirement indicates whether a point in a bad voxel is aligned in direction as well as close in distance with a reference plane, where the point is neighbor point of the reference plane. According to an embodiment, the point merging requirement comprises the following conditions: the normal vector of the reference plane and the normal vector of the point in bad voxel are proximately equal; and the distance from the point to the reference plane along the normal vector of the reference plane is less than a fifth predefined threshold.

As an example, if the angle θ between the normal vector n of the reference plane 801 and the normal vector $n_{pi}$ of the point $P_i$ is less than a threshold, and additionally the distance $h_2$ is also within a limit, the point $P_i$ satisfies the point merging requirement and it is merged into the reference plane 801. The distance $h_2$ is the distance from the point $P_i$ to the reference plane 801 along the normal vector n. In one embodiment, merging a point to a reference plane involves including the point $P_i$ to re-compute the normal vector and the offset of the reference plane.

Figure 9:
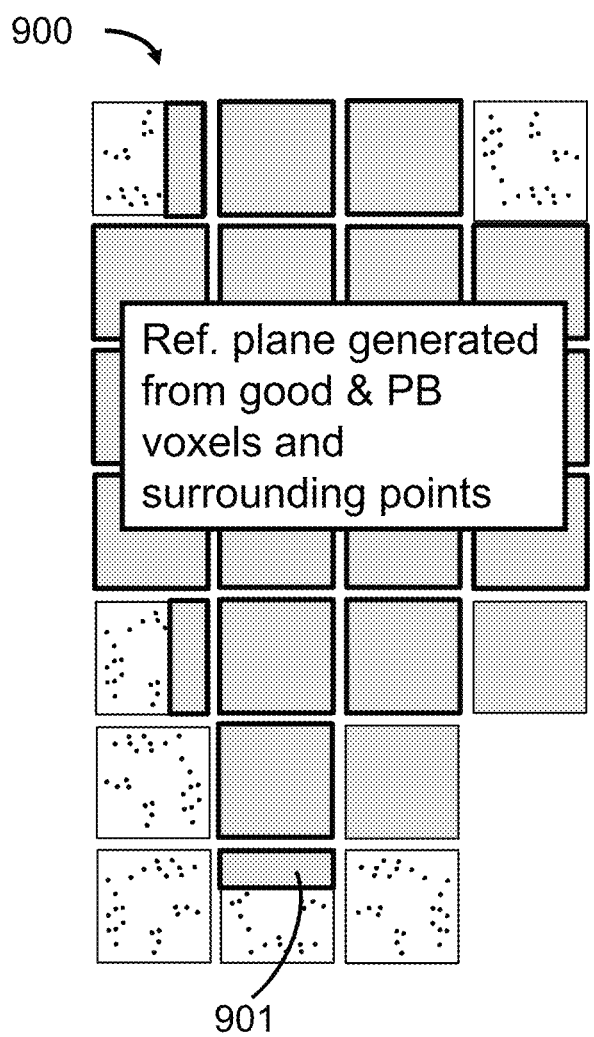

As a result of the process 800, some points in bad voxels are merged to reference planes and some are remained in bad voxels, as shown by the diagram 900 in FIG. 9. It is seen that some points in bad voxels, such as those in the area 901, are merged to the reference plane. It is noticeable that the shape of 901 may be arbitrary depending on which points have been merged.

The reference planes generated from good voxels, some PB voxels and some points in bad voxels can now be used to represent the 3D object. These reference planes may be checked if they can further be merged. In another embodiment, for those remaining points in bad voxels, they can be processed to form planes and then these planes together with the generated reference planes can be checked if all these candidate planes can further be merged.

Figure 10:
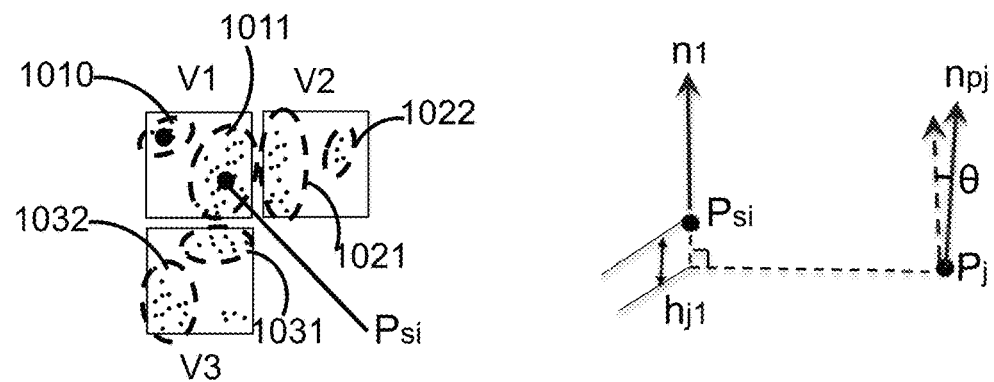
FIG. 10 and FIG. 11 illustrate a process of clustering remaining points in bad voxels to planes based on voxel topology according to an embodiment of the present invention.
Figure 11:
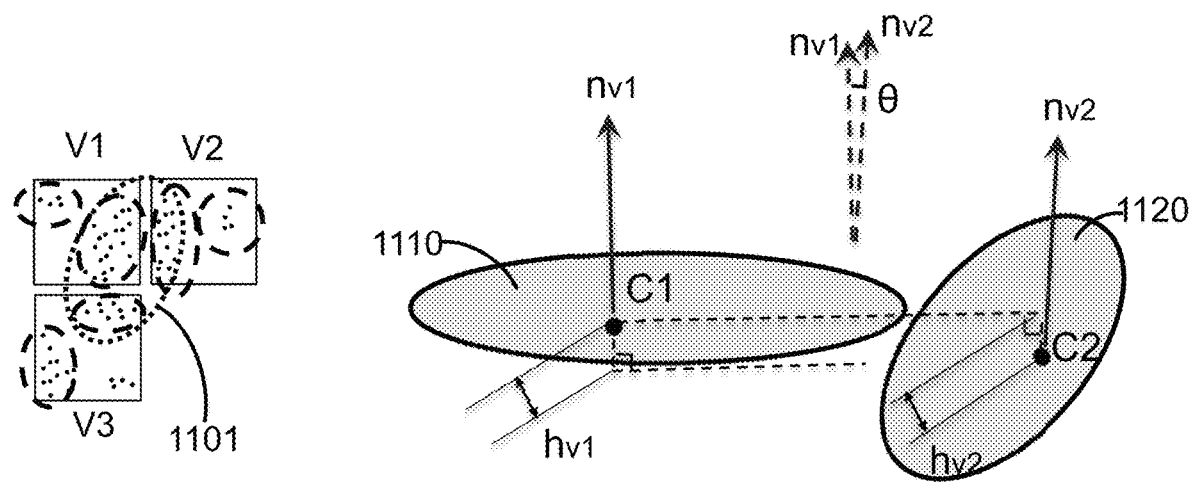

FIG. 10 and FIG. 11 illustrate the process of clustering remaining points in bad voxels to planes based on voxel topology according to an embodiment of the present invention. As shown in FIG. 10, as an example, three neighboring bad voxels V1, V2 and V3 respectively contain a plurality of points, which may be those points originally resided or remaining points left from the other points merged into reference planes.

Some of these points in V1, V2 and V3 can be clustered as groups so as to form respective planes, namely cluster planes. To cluster the points in each bad voxel, a first seed point Psi is randomly selected and its normal vector $n_1$ is calculated. Then points within this voxel are recruited to form a group if these points satisfy a point clustering requirement. The point clustering requirement may comprise the following conditions: the normal vector of the seed point and the normal vector of that point are proximately equal; and the distance from that point to the seed point along the normal vector of the seed point is less than a sixth predefined threshold.

As an example, if the angle θ between the normal vector $n_1$ of the seed point Psi and the normal vector $n_{pj}$ of the point $P_j$ is less than a threshold, and additionally the distance $h_{j1}$ is also within a limit, the point $P_j$ satisfies the point clustering requirement and it is clustered into a group with the seed point Psi. The distance $h_{j1}$ is the distance from the point $P_j$ to the seed point Psi along the normal vector $n_1$. This clustering in a bad voxel continues with other seed points until no group can be formed.

As a result, points in each bad voxel are clustered into several groups. For example, points in V1 are clustered into groups 1010 and 1011, points in V2 are clustered into groups 1021 and 1022, points in V3 are clustered into groups 1031 and 1032. Accordingly, a cluster plane can be generated for each group of clustered points. Further, for the cluster planes in neighboring voxels, a group plane is formed if each pair of the cluster planes satisfy a point grouping requirement.

As shown in FIG. 11, six cluster planes are generated for the neighboring bad voxels V1, V2 and V3. A first cluster plane 1110, such as a cluster plane for group 1011 in V1, and a second cluster plane 1120, such as a cluster plane for group 1021 in V2, can be formed to a group plane 1101 if they satisfy the point grouping requirement.

The point grouping requirement indicates whether the cluster planes in neighboring bad voxels are aligned in direction as well as close in distance with each other. According to an embodiment, the point grouping requirement comprises the following conditions: the normal vectors of a first and a second cluster planes are proximately equal; and the greater value among a first distance and a second distance is less than a pre-determined threshold, where the first distance is a distance between a pair of central points of the first cluster plane and the second cluster plane along the normal vector of the first cluster plane, and the second distance is a distance between the pair of central points along the normal vector of the second cluster plane.

As an example, if the angle θ between the normal vector $n_{v1}$ of the first cluster plane 1110 and the normal vector $n_{v2}$ of the second cluster plane 1120 is less than a threshold, and additionally H=max ($h_{v1}$, $h_{v2}$) is also within a limit, the two cluster planes satisfy the point grouping requirement, and they can be candidate cluster planes to be merged to a group plane. Here, $h_{v1}$ is a distance between the central point C1 of the cluster plane 1110 and the central point C2 of the cluster plane 1120 along the normal vector $n_{v1}$, and $h_{v2}$ is a distance between the pair of central points along the normal vector $n_{v2}$. H represents the greater one between $h_{v1}$ and $h_{v2}$.

If the planes among the three cluster planes for groups 1011, 1021 and 1031 meet the point grouping requirement, they can form a group plane 1101. In this way, points in bad voxels are further grown to planes as larger as possible.

Finally, all the reference planes and group planes can be further merged if they meet a plane merging requirement. In one embodiment, the plane merging requirement comprises (a) the normal vectors of a pair of candidate planes are proximately equal; (b) the greater value among a first distance and a second distance is less than a pre-specified threshold, whereas the first distance is a distance between a pair of central points of the pair of candidate planes along the normal vector of the first candidate plane, and the second distance is a distance between the pair of central points along the normal vector of the second candidate plane; and (c) the candidate planes are near to each other.

Figure 12:
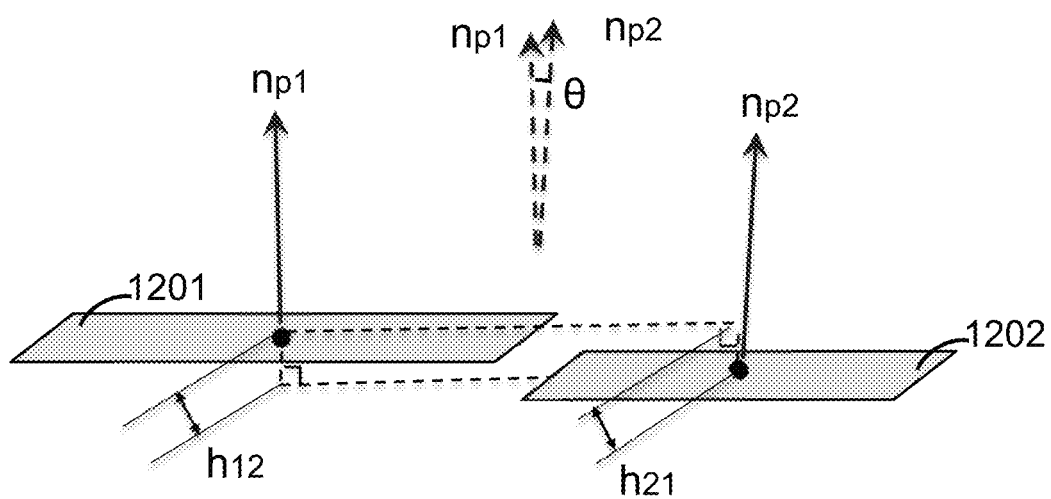
FIG. 12 illustrates conditions of merging planes according to an embodiment of the present invention.

As shown in FIG. 12, two candidate planes 1201 and 1202 are compared in terms of their planar parameters. if the angle θ between the normal vector $n_{p1}$ of the first candidate plane 1201 and the normal vector $n_{p2}$ of the second candidate plane 1202 is less than a threshold, H=max ($h_{12}$, $h_{21}$) is also within a limit, and additionally the two planes are connected, the two candidate planes satisfy the plane grouping requirement and they can be further merged. Here, $h_{12}$ is a distance between the central point of the plane 1201 and the central point of the plane 1202 along the normal vector $n_{p1}$, and $h_{21}$ is a distance between the pair of central points along the normal vector $n_{p2}$. H represents the maximum of $h_{12}$ and $h_{21}$.

Through the above processes of classifying all voxels into three categories, segmenting reference planes from good and PB voxels, merging neighbor points in bad voxels to reference planes, clustering remaining points in bad voxels to generate new planes, and finally merging all planes, planes in a 3D scene are segmented and identified with improved accuracy and high speed. Notably some processes, such as the classifying, the merging PB voxels into reference planes, the merging neighbor points in bad voxels into reference planes, and the clustering procedure can be performed in parallel.

Figure 13:
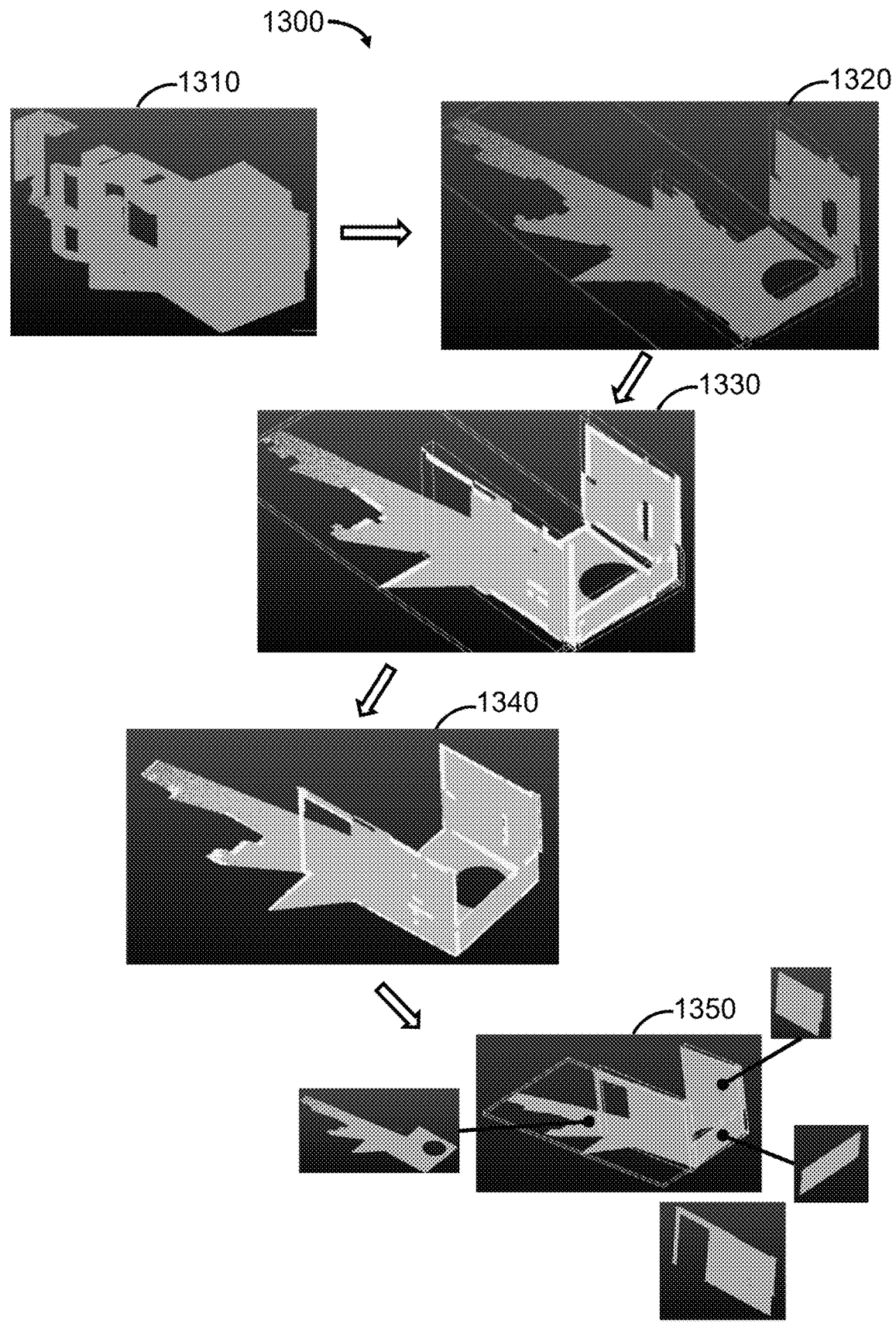
FIG. 13 shows a whole process of identifying planes in a 3D scene in a construction scenario according to an embodiment of the present invention.

FIG. 13 shows a whole process 1300 of identifying planes in a 3D scene 1310 in a construction scenario according to embodiments of the present disclosure. From a 3D scene 1310, after voxelization and voxel classification, reference planes as shown by 1320 are generated from good voxels. Then some PB voxels are merged to the reference planes, resulting in reference planes shown by 1330. The thin white stripes shown in 1330 indicates how the gray-color reference planes 1320 are grown after the PB voxels are merged. Further, points in bad voxels and some PB voxels are merged to the reference planes, and additionally, as described in accordance with FIGS. 10-12, cluster planes are merged together with the reference planes, resulting a 3D scene as shown by 1340. Again, the thin white stripes indicate how the reference planes are further extended from 1330. The planes in the 3D scene 1310 now can be segmented to or identified as respective planes as shown by 1350, and further applications such as plane-related measurements or object recognition may be performed for each 3D object in the 3D scene. It can be seen that with these further step by step in the process 1300, planes are grown progressively from different categories of voxels and points, and in turn the plane segmentation becomes more and more accurate.

With the above approach to find planes having arbitrary poses in 3D scenes by parallel merging by voxels and parallel merging by points based on voxel topology, the segmentation speed and accuracy are significantly improved compared with other conventional methods of plane segmentation, as shown in FIG. 14.

Table 1 below shows the process speed improvement of the plane segmentation according to the present invention.

TABLE 1

Performance comparisons

| Volume of points | PCL | Open3D | the present invention |
|---|---|---|---|
| 997,000 | 1.3422 | 0.6402 s | 0.1936 s |
| 1,550,000 | 310.695 s | 19.062 s | 1.876 s |
| 241,000 | 1.3042 s | 0.1982 s | 0.1028 s |

The above performance comparisons against the PCL (Point Cloud Library) package and the Open3D package using plane segmenting algorithm RANSAC (Random Sample Consensus) are executed on a computer employing an i9 Intel processor running at 3.9 GHz frequency and using 128 G RAM. From table 1, it can be seen that, using the method of the present invention, the processing speed is significantly reduced. Compared with PCL RANSAC, the processing speed is approximately 10 times faster for hundreds of thousands point volume while for an even larger volume of points it is over 100 times faster, and compared with Open3D RANSAC, the processing speed is 2 times faster for hundreds of thousands point volume while for an even larger volume of points it is over 10 times faster.

The diagram 1400 also shows that the accuracy of plane segmentation has been greatly improved, compared with PCL RANSAC and Open3D RANSAC.

According to embodiments, the present invention discloses a methodology of processing huge amount of data points and identifying reliable planes in a 3D space efficiently. The basic principle is to identify different regions of a plane as anchor regions and grow most reliable planes from the anchor regions. And for those data points that do not fall into anchor region of a plane, the methodology examines them by smaller groups in order to recruit them to one of the reliable planes and smaller planes. This is a much more efficient approach than processing each point in the data set individually and then attempt to merge adjacent points together when they exhibit similar properties.

With the present invention, an efficient, fully automated, easy-to-use 3D computer processing method and system can be used in real-time and works on multiple platforms. As described in greater detail above, the advantageous techniques described herein is tolerant to noise and occlusions typically found in the real world. Further, the entire process is fully automated, alleviating the need for manual post-processing to form complete, accurate, fully-formed 3D models suitable for many commercial and consumer applications. The methods and systems described herein are designed to run efficiently on low cost, low power, System on Chip (SoC)-based processor platforms—such as ARM processors that run Android™/Linux™ operating systems.

Figure 15:
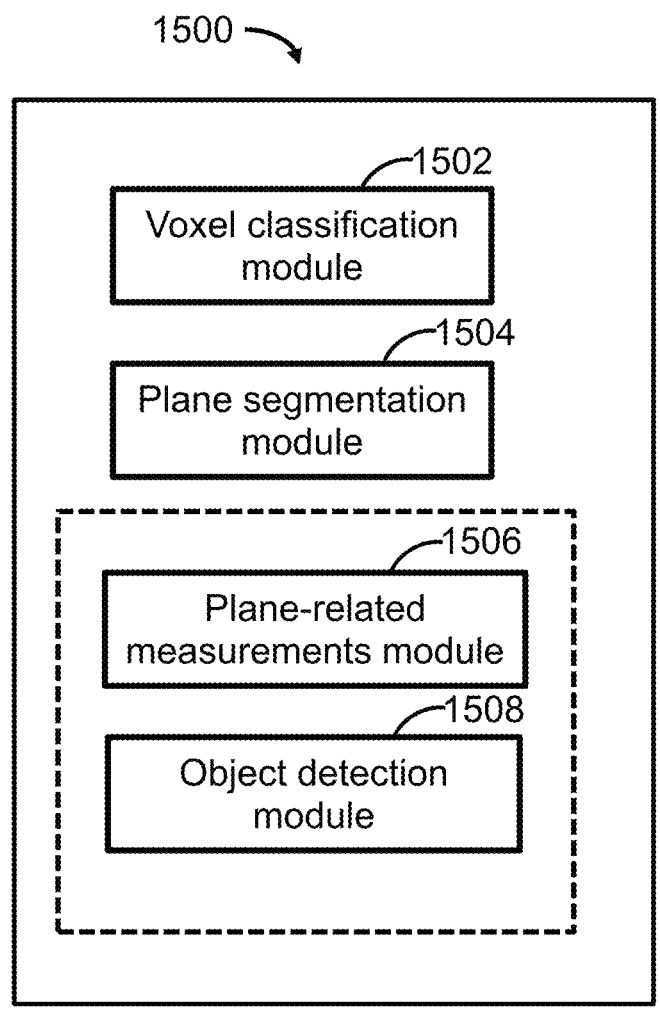
FIG. 15 is a schematic software diagram of a computerized apparatus for identifying planes of at least one 3D object in a 3D scene according to embodiments of the present invention.

FIG. 15 is a schematic diagram of a computerized apparatus 1500 for identifying planes of a 3D object in a 3D scene according to embodiments of the present invention. The computerized apparatus 1500 is operable to perform the methods/processes 200-1300 described with reference to FIGS. 2-13.

To this end, the computerized apparatus 1500 comprises a voxel classification module 1502 configured to voxelize a point cloud of a 3D scene into a plurality of voxels of equal dimensions, where the 3D scene comprises at least one 3D object represented by a plurality of points in the point cloud, classify the plurality of voxels into three categories, wherein each first category voxel satisfies a planar requirement and a first neighborhood constraint, each second category voxel satisfies the planar requirement and a second neighborhood constraint, and each third category voxel does not satisfy the planar requirement. Further, the computerized apparatus 1500 comprises a plane segmentation module 1504 configured to generate at least one reference plane from the first category voxels by first identifying a first category anchor voxel and recruiting its neighboring first category voxels to this at least one reference plane; and grow the at least one reference plane by absorbing second category voxels connecting to the at least one reference plane if they satisfy a voxel merging requirement and absorbing points in the third category voxels connecting to the at least one reference plane if they satisfy a point merging requirement.

In some embodiments, the computerized apparatus 1500 further comprises plane-related measurements module 1506, and/or an object detection module 1508. The plane-related measurements module 1506 is configured to test the planarity of a plane resulted from the plane segmentation module 1504 for a 3D object. The object detection module 1508 is configured to recognize objects based the identified planes in the 3D scene.

The apparatus or system and method of the present invention may be implemented in the form of a software application running on a computerized system. Further, portions of the methods may be executed on one such computerized system, while the other portions are executed on one or more other such computerized systems. Examples of the computerized system include a mainframe, personal computer, handheld computer, server, etc. The software application may be stored on a recording media locally accessible by the computer system and accessible via a hard wired or wireless connection to a network, for example, a local area network, or the Internet.

The computerized system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computerized system can be connected to a data storage device.

Figure 16:
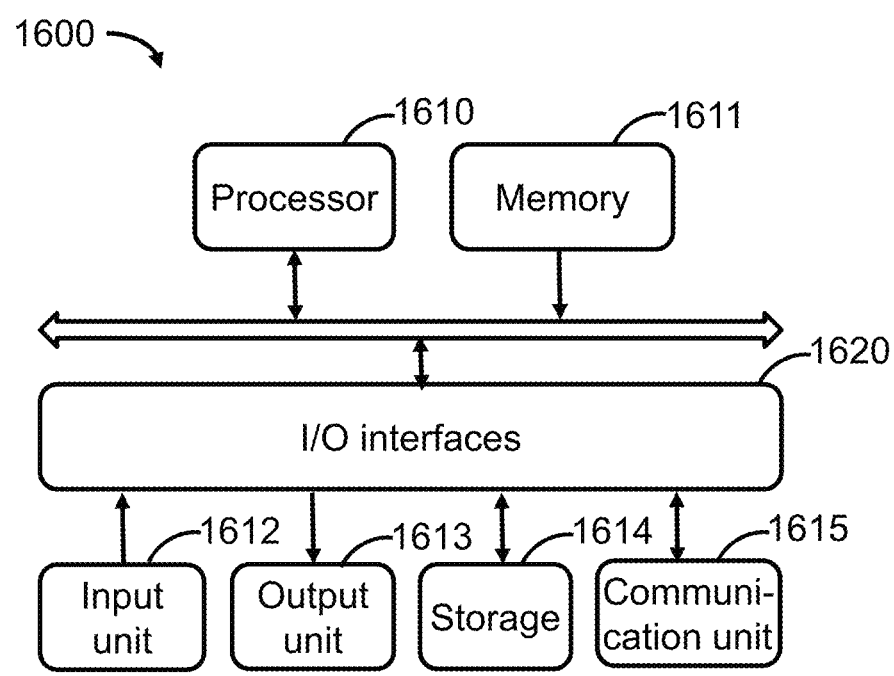
FIG. 16 is a schematic diagram of a computerized system for identifying planes of at least one 3D object in a 3D scene according to an embodiment of the present invention.

The apparatus or system and method of the present disclosure may be implemented in the form of a software application running on a computerized system. FIG. 16 is a schematic diagram of a computerized system 1600 for identifying planes of objects in 3D scenes according to an embodiment of the present invention, consisting of both the hardware and software components that can be used to implement the embodiments of the present invention.

The hardware components in the present embodiment further comprises the processor 1610, memory 1611 and multiple interfaces. A plurality of components in the computerized system 1600 is connected to the I/O interface 1620, including input unit 1612, output unit 1613, storage unit 1614 and communication unit 1615, which include, but not limit to, network card, modem, radio communication transceiver etc. In another embodiment, the present disclosure may also be deployed in a distributed computing environment that includes more than one computerized system 1600 connected together through one or more networks. The networks can include one or more of the internet, an intranet, an extranet, a cellular network, a local area network (LAN), a home area network (HAN), metropolitan area network (MAN), a wide area network (WAN), a Bluetooth network, public and private networks, etc.

The processor 1610 can be a central processing unit (CPU), microprocessor, microcontrollers, digital signal processor (DSP), field programmable gate arrays (FPGA), application-specific integrated circuits (ASIC), etc., for controlling the overall operation of memory (such as random access memory (RAM) for temporary data storage, read only memory (ROM) for permanent data storage, and firmware). One or more processors can communicate with each other and memory and perform operations and tasks that implement one or more blocks of the flow diagrams discussed herein.

The memory 1611, for example, stores applications, data, programs, algorithms (including software to implement or assist in implementing example embodiments) and other data. Memory 1611 can include dynamic or static random-access memory (DRAM or SRAM) or read-only memory such as Erasable and Programmable Read-Only Memories (EPROMs), Electrically Erasable and Programmable Read-Only Memories (EEPROMs) and flash memories, as well as other memory technologies, singly or jointly combined. In some embodiments, the processor 1610 can be configured to execute the above described various procedures and processing, such as methods/processes 200-1500 described with reference to FIGS. 2-15.

The storage 1614 typically includes persistence storage such as magnetic disks such as fixed and removable disks; other magnetic media including tape; optical media such as Compact Disks (CDs) or Digital Versatile Disks (DVDs), and semiconductor storage devices such as flash memory cards, solid-state drive, EPROMs, EEPROMS or other storage technologies, singly or in combination. Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

The input unit 1612 is the interfacing components that connect the computerized system 1600 to data input devices such as keyboard, keypad, pen-based device, mouse or other point devices, voice-input apparatus, scanner or other input technologies. According to an embodiment of the present invention, the input unit 1612 may include at least one 3D sensor which captures a 3D scene for providing 3D data of the 3D scene to the computerized system 1600. The output unit 1613 is the interfacing components for the computerized system 1600 to send data to the output devices such as a CRT or flat panel display monitor, printer, voice output apparatus, laud speaker or other output technologies. The communication unit 1615 may typically include the serial or parallel interface and the USB (Universal Serial Bus) interfaces, and other interfacing technologies. The communication unit 1615 may also enables the computerized system 1600 to exchange information with external data-processing devices via a data communication network such as the Personal Area Network (PAN), the Local Area Network (LAN), the Wide Area Network (WAN), the Internet, and other data communication network architectures. The communication unit 1615 can include the Ethernet interface, the Wireless LAN interface device, the Bluetooth interfacing device and other networking devices, singly or in combination.

Software further includes the operating system, and the application software systems as shown in FIG. 15. Operating system is to manage all the hardware resources, and schedule executing priorities for all tasks and processes so that the four application software systems can all be executed in an orderly manner.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. The computerized system 1600 as shown in FIG. 16 is therefore an exemplary embodiment of how the present invention can be implemented. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A computer implemented method for identifying planes of a 3D object in a 3D scene, comprising:
receiving a point cloud of the 3D scene, the 3D scene comprising at least one 3D object represented by a plurality of points in the point cloud;
voxelizing the point cloud into a plurality of voxels of equal dimensions;
classifying the plurality of voxels into three categories, wherein each first category voxel satisfies a planar requirement and a first neighborhood constraint, each second category voxel satisfies the planar requirement and a second neighborhood constraint, and each third category voxel does not satisfy the planar requirement;
generating at least one reference plane from the first category voxels by first identifying a first category anchor voxel and recruiting its neighboring first category voxels to the at least one reference plane;
growing the at least one reference plane by absorbing the second category voxels connecting to the at least one reference plane if they satisfy a voxel merging requirement and absorbing points in the third category voxels connecting to the at least one reference plane if they satisfy a point merging requirement; and
using a set of the at least one reference plane to represent the 3D object,
wherein the first neighborhood constraint with respect to a given voxel comprises the following conditions:
the number of good neighbors of the given voxel is greater than a first predefined threshold and
the number of bad neighbors of the given voxel is less than a second predefined threshold;
wherein the good neighbor is a neighboring voxel that satisfies a planar alignment requirement and the bad neighbor is a neighboring voxel that does not satisfy the planar alignment requirement;
wherein the planar alignment requirement comprises that an angular alignment of a normal vector of the neighboring voxel against a normal vector of the given voxel is less than a pre-specified value; and
wherein the second neighborhood constraint with respect to a given voxel comprises the following conditions:
the number of the good neighbors of the given voxel is greater than a third predefined threshold and the number of the bad neighbors is greater than or equal to the second predefined threshold; and
wherein the first predefined threshold is greater than the third predefined threshold.

2. The method of claim 1, wherein the planar requirement comprises a condition that the points inside the voxel demonstrate a planar distribution.

3. The method of claim 1, wherein the step of generating at least one reference plane from the first category voxels comprises:
assigning a unique initial voxel index to each voxel;
for each of the first category voxel,
using this first category voxel as a center and grouping voxels adjacent to the center to form a voxel neighbor group for this first category voxel; and
assigning a good neighbor count to this voxel wherein the good neighbor count is the number of the first category voxels in this voxel neighbor group;
for each of the voxel neighbor group,
assigning a parent voxel index to all members of this voxel neighbor group wherein the parent voxel index is the initial voxel index having a highest good neighbor score within this voxel neighbor group;
for the voxel neighbor groups that overlap with each other by at least one voxel,
if the parent voxel indices among these voxel neighbor groups are different, identifying the parent voxel index that has the highest good neighbor score among them as a designated parent voxel index; and
for the voxel neighbor groups which do not have the highest good neighbor score, re-assigning the parent voxel index of all voxels in these groups to the designated parent voxel index;
repeating the re-assigning step until no further re-assignment occurs; and
forming the at least one reference plane by grouping all voxels having the same parent voxel index together.

4. The method of claim 3, the step of generating at least one reference plane from the first category of voxels comprises:
if there are more than one voxel within this voxel neighbor group having the same highest good neighbor score, choosing a voxel that has the lowest initial index as the parent voxel index; and
if there are more than one said voxel neighbor group having the same highest good neighbor score, selecting the lowest parent voxel index as the designated parent voxel index.

5. The method of claim 3, wherein the good neighbor score meets at least one of the following requirements:
having most neighbor voxels of the first category;
having fewest neighbor voxels of the third category; and
being flattest voxel in the voxel neighbor group.

6. The method of claim 1, wherein the voxel merging requirement comprises the following conditions:
a normal vector of the at least one reference plane and a normal vector of a neighboring second category voxel are proximately equal; and
an offset distance between the at least one reference plane and a plane of the neighboring second category voxel is less than a fourth predefined threshold.

7. The method of claim 1, wherein the step of growing the at least one reference plane comprises:
for each voxel in the second category,
merging the voxel into the at least one reference plane if the voxel merging requirement is satisfied; and
recomputing a normal vector and an offset of the at least one reference plane.

8. The method of claim 1, further comprising:
labelling the second category voxels as the third category voxels if they do not satisfy the voxel merging requirement.

9. The method of claim 1, wherein the point merging requirement comprises the following conditions:
a normal vector of the at least one reference plane and a normal vector of a point in the third category voxel are proximately equal; and
a distance from the point to the at least one reference plane along the normal vector of said reference plane is less than a fifth predefined threshold.

10. The method of claim 1, wherein the step of growing the at least one reference plane comprises:
for each point in the third category voxel,
merging the point into the at least one reference plane if the point merging requirement is satisfied; and recomputing a normal vector and an offset of the at least one reference plane.

11. The method of claim 10, further comprising:
randomly selecting a seed point from the remaining points in the third category voxel; and
recruiting points within the third category voxel to form a cluster plane if these points satisfy a point clustering requirement;
wherein the point clustering requirement comprises: a normal vector of the seed point and a normal vector of that point are proximately equal; and a distance from that point to the seed point along the normal vector of the seed point is less than a sixth predefined threshold.

12. The method of claim 11, further comprising:
for the cluster planes in neighboring voxels,
generating a group plane if each pair of the cluster planes satisfies a point grouping requirement; and
merging the at least one reference plane and the group planes if they satisfy a plane merging requirement to identify at least one plane of a 3D object.

13. The method of claim 12, wherein the point grouping requirement comprises the following conditions:
normal vectors of a first and a second cluster plane are proximately equal; and
a greater value among a first distance and a second distance is less than a pre-determined threshold, the first distance being a distance along the normal vector of the first cluster plane between a pair of central points of the first cluster plane and the second cluster plane, and the second distance being a distance along the normal vector of the second cluster plane between the pair of central points.

14. The method of claim 12, wherein the plane merging requirement comprises the following conditions:
normal vectors of a pair of candidate planes are proximately equal;
a greater value among a first distance and a second distance is less than a pre-specified threshold, the first distance being a distance along the normal vector of the first candidate plane between a pair of central points of the pair of candidate planes, and the second distance being a distance along the normal vector of the second candidate plane between the pair of central points; and
the candidate planes are near to each other.

15. A computerized system comprising:
a processor;
a memory coupled to the processor, the memory and the processor together configured to cause the computerized system to perform actions comprising:
receiving a point cloud of a 3D scene, the 3D scene comprising at least one 3D object represented by a plurality of points in the point cloud;
voxelizing the point cloud into a plurality of voxels of equal dimensions;
classifying the plurality of voxels into three categories, wherein each first category voxel satisfies a planar requirement and a first neighborhood constraint, and each second category voxel satisfies the planar requirement and a second neighborhood constraint, and each third category voxel does not satisfy the planar requirement;
generating at least one reference plane from the first category voxels by first identifying a first category anchor voxel and recruiting its neighboring first category voxels to this at least one reference plane;
growing the at least one reference plane by absorbing the second category voxels connecting to the at least one reference plane if they satisfy a voxel merging requirement; and absorbing points in the third category voxels connecting to the at least one reference plane if they satisfy a point merging requirement; and
using a set of the at least one reference plane to represent the 3D object,
wherein the first neighborhood constraint with respect to a given voxel comprises the following conditions:
the number of good neighbors of the given voxel is greater than a first predefined threshold and
the number of bad neighbors of the given voxel is less than a second predefined threshold; and
the second neighborhood constraint with respect to a given voxel comprises the following conditions:
the number of the good neighbors of the given voxel is greater than a third predefined threshold and the number of the bad neighbors of the given voxel is greater than or equal to the second predefined threshold;
wherein the first predefined threshold is greater than the third predefined threshold;
wherein the good neighbor is a neighboring voxel that satisfies a planar alignment requirement and the bad neighbor is a neighboring voxel that does not satisfy the planar alignment requirement; and
wherein the planar alignment requirement comprises that an angular alignment of a normal vector of the neighboring voxel against a normal vector of the given voxel is less than a pre-specified value.

16. The computerized system according to claim 15, wherein the action of generating at least one reference plane from the first category voxels comprises:
assigning a unique initial voxel index to each voxel;
for each of the first category voxel,
using this first category voxel as a center and grouping voxels adjacent to the center to form a voxel neighbor group for this first category voxel; and
assigning a good neighbor count to this voxel wherein the good neighbor count is the number of the first category voxels in this voxel neighbor group;
for each of the voxel neighbor group,
assigning a parent voxel index to all members of this voxel neighbor group wherein the parent voxel index is the initial voxel index having a highest good neighbor score within this voxel neighbor group;
for the voxel neighbor groups that overlap with each other by at least one voxel,
if the parent voxel indices among these voxel neighbor groups are different, identifying the parent voxel index that has the highest good neighbor score among them as a designated parent voxel index; and
for the voxel neighbor groups which do not have the highest good neighbor score, re-assigning the parent voxel index of all voxels in these groups to the designated parent voxel index;
repeating the re-assigning step until no further re-assignment occurs; and
forming the at least one reference plane by grouping all voxels having the same parent voxel index together.

17. The computerized system according to claim 15, further comprising at least one 3D sensor to capture the 3D scene for providing 3D data of the 3D scene to the computerized system.

* * * * *